United States Patent [19]

Ferretti et al.

[11] Patent Number: 4,788,648

[45] Date of Patent: Nov. 29, 1988

[54] METHOD AND SYSTEM FOR MEASUREMENT OF A LIQUID LEVEL IN A TANK

[75] Inventors: Michael D. Ferretti, Nazareth; Brian L. Gabel, Northampton; James A. Horton, Bethlehem; Thomas S. Weiss, Sr., Emmaus; Kevin K. Miller, Breinigsville, all of Pa.

[73] Assignee: Air Products and Chemicals, Inc., Allentown, Pa.

[21] Appl. No.: 867,853

[22] Filed: May 27, 1986

Related U.S. Application Data

[63] Continuation-in-part of Ser. No. 664,817, Oct. 25, 1984, Pat. No. 4,602,344.

[51] Int. Cl.$^4$ .................... G01F 23/00; F15B 5/00; G06F 15/24
[52] U.S. Cl. .................. 364/509; 73/291; 340/618; 340/870.16; 364/575
[58] Field of Search ............. 364/509, 575; 73/291; 340/870.16, 618

[56] References Cited

U.S. PATENT DOCUMENTS

| | | | |
|---|---|---|---|
| 3,371,534 | 3/1968 | Akeley | 73/299 |
| 3,640,134 | 2/1972 | Hop | 73/299 |
| 4,201,240 | 5/1980 | Case | 137/392 |
| 4,275,382 | 6/1981 | Jannotta | 364/509 X |
| 4,332,166 | 6/1982 | Lawford | 73/299 |
| 4,388,691 | 6/1983 | Nuspl | 364/510 |
| 4,437,162 | 3/1984 | Kato | 364/442 |
| 4,471,656 | 9/1984 | Sanders et al. | 73/438 |
| 4,509,044 | 4/1985 | Yachida | 364/509 X |
| 4,545,020 | 10/1985 | Brasfield | 364/509 |
| 4,598,742 | 7/1986 | Taylor | 364/509 |

FOREIGN PATENT DOCUMENTS 1029184 1/1971 U.S.S.R. .

*Primary Examiner*—Felix D. Gruber
*Attorney, Agent, or Firm*—James C. Simmons; William F. Marsh

[57] ABSTRACT

A system for dispatching a refilling vehicle to a tank updates a prior collected average level of substance in the tank. It continuously determines values of differential pressure within the tank and in accordance with the values of differential pressure, calculates the instantaneous level of substance within the tank. A prior collected average level is stored and is compared with each of the instantaneous values of level thus obtained. On the basis of this comparison a relative weighting factor is determined which weighs the relative contribution of the collected and instantaneous values in determining a new collected value. In one embodiment a remote location may interrogate to determine the rate of usage over a predetermined time window. In another embodiment when the new collected average falls below a set point a selected one of a plurality of remote locations is signalled to dispatch a refilling vehicle. A remote location may be selected in accordance with the time of day or the substance in the tank. The time window, the set points and selection of a remote location may all be programmed from a remote location.

12 Claims, 2 Drawing Sheets

Microfiche Appendix Included
(2 Microfiche, 123 Pages)

METHOD AND SYSTEM FOR MEASUREMENT OF A LIQUID LEVEL IN A TANK

This is a continuation-in-part of application Ser. No. 664,817 filed Oct. 25, 1984 and now U.S. Pat. No. 4,602,344.

Microfiche Appendices are included in this appliction containing two microfiche. The icrofiche numbered one contains 62 frames plus one test target frame, for a total of 63 frames. The second microfiche, numbered two contains 59 frames plus one test target frame for a total of 60 frames.

BACKGROUND OF THE INVENTION

A. Field of the Invention

This invention relates to the replenishing of substance within liquid storage tanks and, in particular, replenishing such tanks when the substance in the tanks produces erratic pressure readings when drawn or replenished.

B. Background Art

Many liquid products are delivered in bulk to a user's site where they are held in a storage tank, from which either intermittent or continuous withdrawal may occur. Examples include liquid fuels such as domestic heating oil, liquid chemicals employed in manufacturing processes, and liquified gases such as oxygen or nitrogen.

For some applications, it is important that the tank never run dry. For example, liquified nitrogen is a source of inert nitrogen gas for submerging various industrial processes and operations. If the supply of nitrogen runs out during a process run, an entire production lot may be destroyed. Nitrogen gas is also used to purge storage tanks from which flammable liquids are being withdrawn to avoid the entrance of air and the subsequent formation of explosive mixtures. Exhaustion of nitrogen during this process can result in an explosion.

Two methods were commonly employed to insure that liquid was available at all times in these storage tanks. The first method was to anticipate from past experience the rate of withdrawal of liquid from the tank, and to extrapolate to estimate the time at which replenishment was needed. This approach assumed that current usage patterns were similar to prior usage patterns. If depletion were more rapid than anticipated because of increased use or leakage, the tank could empty before the normal replenishment time was reached. Likewise, if usage were unexpectedly curtailed, an unnecessary trip by the supplier's delivery vehicle resulted in the addition of only a small amount to top off the tank.

The second approach was for the user to periodically measure the amount of substance remaining in the tank, and notify the supplier when a delivery was required. This method depended entirely upon the diligence of the user in adhering to a schedule of tank readings and the user's ability to recognize the necessity of a request for a delivery.

In some applications usage tends to be more concentrated in certain periods of the day than others. For example there may be an application where there is very heavy usage between noon and four o'clock in the afternoon. Thus reaching a predetermined low level in this situation at eleven o'clock in the morning could be more critical than reaching such a level at five o'clock in the afternoon. Therefore it is useful to know the usage pattern when interpreting a tank reading in order to determine the urgency for refilling a tank.

Furthermore, it was not possible, in the case of cryogenic liquids, for the user to obtain a direct measurement of the substance level. Typically, the user had available only pressure readings from the tank from which to determine the substance level. These pressure readings included (1) the pressure in the vapor space at the tank and (2) the differential pressure which is the difference between the vapor space pressure and the pressure at the bottom of the tank, called the substance weight pressure.

The relationship between these two variables, the vapor space pressure and the differential pressure, and the actual substance volume is a complex high order polynomial. Solution charts for this polynomial have been prpared. Thus, to get an accurate measurement of the substance volume, the user was required to locate the correct chart entry depending on the pressure readings. These charts were different for different substances and for different tanks.

Further complicating these problems was the fact that, when substance was supplied to a cryogenic tank the vapor space pressure readings became erratic. This happens when the pump forces new substance into the tank when the substance is at a different temperature than that of the tank. The temperature differential results in vaporization of liquid which in turn causes turbulence in the tank and unpredictable fluctuations. Thus, for practical purposes it is extremely difficult to determine substance level under conditions of replenishing.

For purposes of considering the patentability of the invention disclosed and claimed, a brief patentability search was conducted with respect to parent application Ser. No. 664,817. The patents identified to be of possible interest in that search were:

| Patent No. | Inventor |
|---|---|
| Re. 19,868 | Schontzler et al. |
| 4,201,240 | Case |
| 4,250,750 | Martinec et al. |
| 4,252,097 | Hartford et al. |
| 4,296,472 | Sarkis |
| 4,313,114 | Lee et al. |
| 4,353,245 | Nicolai |
| 4,361,037 | Hauschild et al. |
| 4,402,048 | Tsuchida et al. |
| 4,434,657 | Matsumura et al. |
| 4,437,162 | Kato |
| 4,441,157 | Gerchman et al. |

SUMMARY

A method for dispatching a refilling vehicle to a tank updates a prior collected average level of substance in the tank. It continuously determines values of differential pressure within the tank and in accordance with the values of differential pressure, calculates the isntaneous level of substance within the tank. A prior collected average level is stored and is compared with each of the instantaneous values of level thus obtained. On the basis of this comparison a relative weighting factor is determined which weighs the relative contribution of the collected and instantaneous values in determining a new collected value. In one embodiment, a remote location may interrogate to determine the rate of usage over a predetermined time window.

In another embodiment, when the new collected average falls below a set point a selected one of a plurality of remote locations is signalled to dispatch a refilling vehicle.

DETAILED DESCRIPTION OF THE INVENTION

Figure 1:
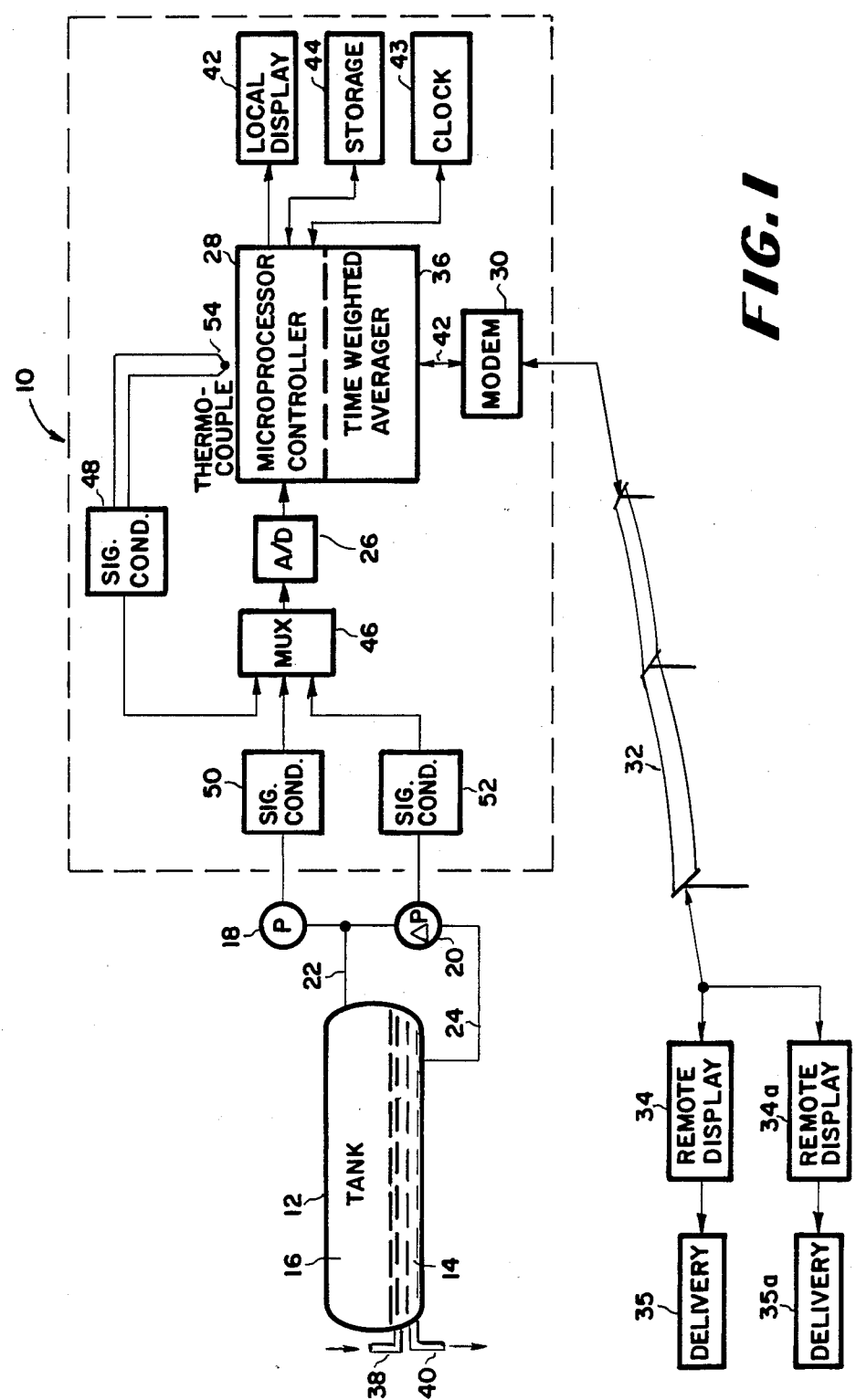
FIG. 1 is a block diagram of system 10 for measuring liquid level in a tank of the present invention.

FIG. 1 shows a block diagram of microprocessor based intelligent user tank telemetry system 10. Tank telemetry system 10 continuously monitors the substance level of a tank 12 at a user location containing a cryogenic liquid, having an inlet 38 and an outlet 40 and containing substance space 14 and vapor space 16. Pressure sense line 24 couples substance space 14 to differential pressure gauge 20. System 10 includes three signal conditioners 48, 50 and 52. The outputs of signal conditioners 48, 50 and 52 are multiplexed by multiplexer 46 and the single output of multiplexer 46 is applied to A/D converter 26. Microprocessor controller 28 has conventional volatile and non-volatile memory and a time weighted software-based averager 36 which smooths out erratic substance level determinations.

Automatic dialing modem 30 is coupled to remote display or remote location 34 by telephone lines 32 allowing system 10 to call remote location 34 to report such information as the level of substance 14 in tank 12. System 10 may call alternate distributors depending on the time of the day and the distributor's business hours. Remote location 34 may also interrogate system 10 to determine the rate of substance usage over a predetermined time window and to determine the times of the maximum and minimum pressure within tank 12. Parameters such as phone numbers, window durations, set points, business hours of distributors etc. may be reprogrammed from remote location 34 by way of telephone line 32 and modem 30

Microprocessor controller 28 controls the operation of system 10 in accordance with a program stored in memory storage 44. The listing for the program for controller 28 appears in the form of a microfiche made of record in the application file as Appendix 2 and is written in a structured format understandable to those of ordinary skill in the art.

Pressure transducer 18 produces an analog signal proportional to the pressure of vapor space 16. Differential pressure transducer 20 produces an analog signal proportional to the difference between the pressure of vapor space 16 and the pressure at the bottom of substance space 14. The analog output signals of transducers 18, 20 are conditioned by signal conditioners 50, 52 respectively. The conditioned signals are multiplexed by multiplexer 46 and applied to A/D converter 26.

A/D converter 26 converts the multiplexed analog output signals into digital signals and applies these digital signals to microprocessor controller 28. Based upon the signal generated by differential pressure transducer 20 and received from A/D converter 26, microcontroller 28 periodically determines an instantaneous level of substance in substance space 14. This determination requires only a multiplication of the differential pressure signal by a predetermined constant. A typical value for this constant is 27.67. From these instantaneous values of substance level time-weighted averager 36 determines a collected average level. Controller 28 stores collected average levels for later use in determining usage rates and recognizes collected average substance levels below a plurality of predetermined threshold set points.

System 10 is applicable to any storage tank 12 but time-weighted averager 36 within controller 28 is particularly useful when the substance within tank 12 is a cryogenic substance because of complications inherent in the storage of cryogenic liquids. Thus, time-weighted averager 36 is provided within controller 28. When a cryogenic substance is supplied to tank 12 through inlet 38, or drawn from tank 12 through outlet 40, unpredictable erratic fluctuations in the vapor space pressure of vapor space 16 can be produced. This results in fluctuations in the output of differential pressure transducer 20. The turbulence which results in differential pressure fluctuation is caused by such factors as the pumps used to move the substance, the temperature differential of the substance being supplied to the tank and that in the tank, and the requirement that a new equilibrium between vapor space 16 and substance space 14 be established.

These problems may occur only periodically during occasional replenishing and drawing of substance in some applications or they may occur on a continuous basis in applications where substance is continuously drawn from tank 12. These erratic fluctuations in differential pressure cause controller 28 to produce erratic instantaneous substance level calculations. The erratic calculated values of substance level could result in false calls by modem 30 to remote display 34 unless the level calculations are smoothed by time-weighted averager 36.

System 10 may perform all the operations described herein upon more than one tank 12 concurrently by having controller 28 monitor the pressure for each tank 12 on separate channels (not shown). If more than one tank 12 is monitored by system 10, the particular tank 12 being reported on is identified by its tank number when system 10 communicates with remote display 34. Furthermore the tanks moinitored may not all contain cryogenic substances. Some tanks may contain bulk gases such as helium, oxygen, argon or nitrogen. System 10 monitors only pressure on tanks containing bulk gases rather than collected average levels.

Figure 2:
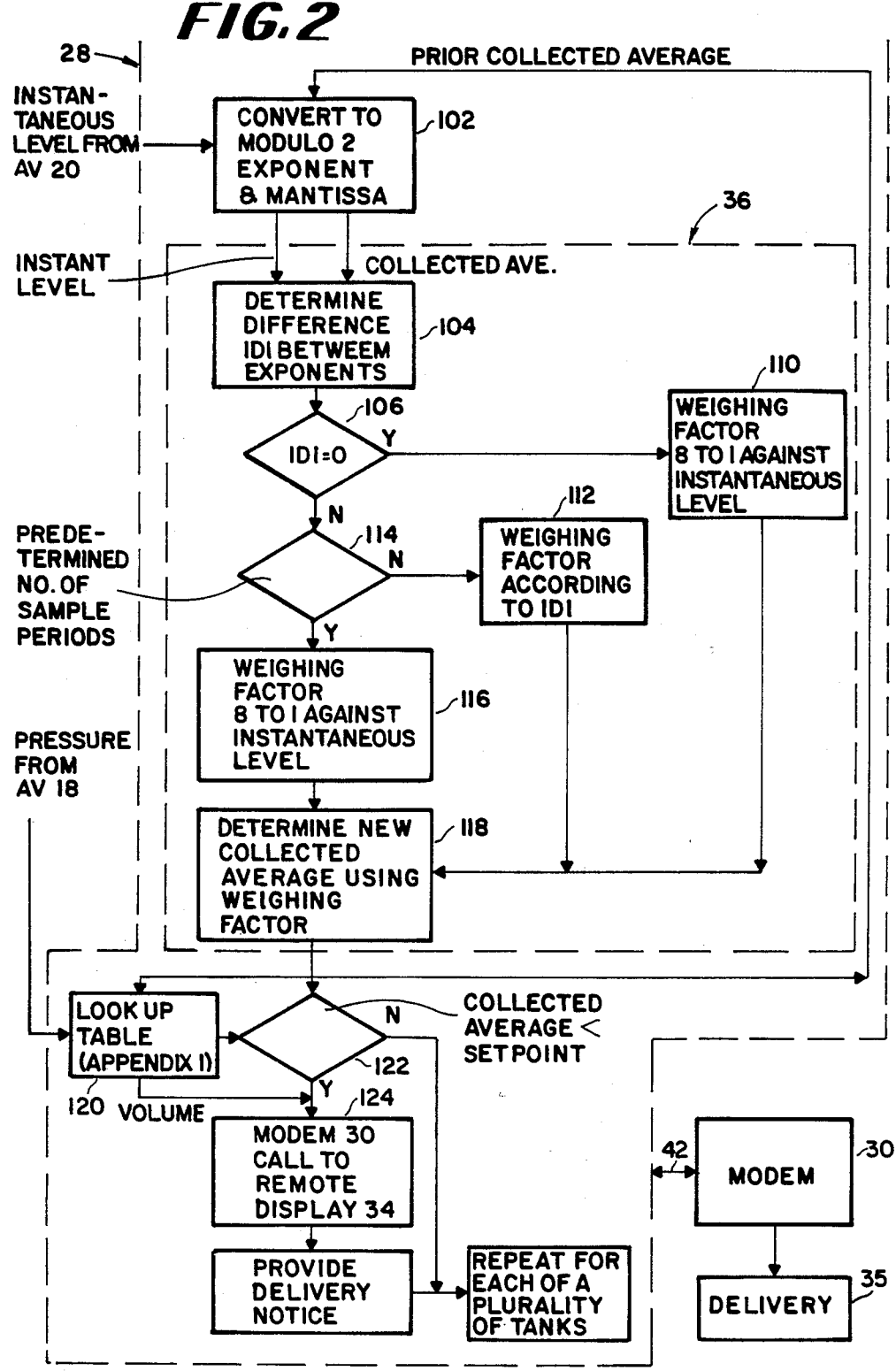
FIG. 2 is a flow diagram of portions of system 10 of FIG. 1.

Referring now to FIG. 2, there is shown a flow diagram of portions of controller 28 and averager 36. Microprocessor controller 28 applies two values to time-weighted averager 36, (1) the instantaneous tank level signal, as determined from the most recent value of differential pressure applied to microcontroller 28 by transducer 20, and (2). the prior collected average level stored within the memory of controller 28. The prior collected average is the current level of substance within tank 12 as of the most recent update. The instantaneous tank level is the most recent level calculated from the signal of transducer 20 and may be based upon quiescent differential pressures or upon sample values of erratically fluctuating differential pressures. The signal conditioning and multiplexing of the signals from transducers 18,20 have been omitted from FIG. 2 to simplify th drawing.

The instantaneous value of tank level supplied to time-weighted averager 36 is converted into a modulo two mantissa and exponent at block 102 of controller 28 before being supplied to time-weighted averager 36. It is converted into a modulo two mantissa and exponent in the following way. The instantaneous level determined from the vapor space pressure and the differential pressure is repeatedly divided by two until a mantissa between 0 and 0.5 is produced. The number of divisions required to produce such a mantissa is counted and stored in base two form as the exponent. The collected average is processed into a modulo two mantissa and exponent in the same manner before being passed to time-weighted averager 36.

In block 104 and decision 106 time-weighted averager 36 compares the exponent of the new instantaneous level received from transducer 20 with the exponent of the prior collected average which is received by averager 36 from controller 28. When a difference between exponents is detected in decision 106 the NO path of decision 106 is followed and a weighting factor may be determined either: (1) in block 112 from the absolute value of the difference D between the exponent of the collected average value and the exponent of the instantaneous value as determined in block 104, or (2) in block 116 in which an 8 to 1 weighting factor against the instantaneous level is assigned. When block 112 is executed each difference of one between the exponents results in another factor of two in the relative weighing. Thus, there is an increasing rejection of deviant values because of the base 2 exponential arithmetic in the determination of the weighing factor.

If a difference between the exponent of the collected average and the exponent of the instantaneous level value persists for a predetermined number of sample periods, as determined at decision 114, a weighing factor of 8 to 1 against the instantaneous level is determined for one sample period in block 116. A sample period, is the time between readings of the signal from transducer 20 and is approximately one minute. One instantaneous value of substance level and one value of collected average level are determined for each such sample period.

The predetermined number of sample periods during which the difference between the instantaneous exponent and the collected exponent must persist before time-weighted averager 36 switches to the 8 to 1 weighting factor for one period varies depending on the size and shape of tank 12 and this number of sample periods is represented as N. N is normally two or three sample periods. Following this one period with an 8 to 1 weighting factor, time-weighted averager 36 returns to using a weighting factor which is the absolute value of the difference between the exponents as described previously for block 112. If a difference between the instantaneous exponent and the collected average again persists for N sample periods, the 8 to 1 weighing factor of block 116 is again determined. This permits time-weighted averager 36 to respond more quickly to real changes in level while retaining a capability to reject noise and spurious readings.

If the exponent of the collected averages and the exponent of the instantaneous values remain equal for a predetermined period of time sufficient to produce an affirmative determination at decision 106, the average is weighted 8 to 1 against the instantaneous value at block 110. Thus time-weighted averager 36 is a three tiered time-weighted averager.

There is a first weighting tier which is used when the exponent of the new instantaneous value remains the same as the exponent of the collected average for a predetermined period of time block 110, a second weighting tier which is used when there is a variation between the collected average exponent and the instantaneous value exponent (block 112), and a third weighting tier which is used when the variation between the collected value exponent and the instantaneous value exponent persists longer than a predetermined period of time (block 116). Regardless of which of the possible weighting tiers is used, the resulting averaged value becomes the new collected average at block 118. The next time that time weighted averager 36 performs its calculations, this new collected average is used as the prior collected average in block 102.

Controller 28 is coupled to modem 30 by bidirectional line 42. Controller 28 compares the collected average against a predetermined set point value stored in its memory at decision 122. When controller 28 determines that the collected average of the level of substance in tank 12 has fallen below a predetermined low level set point, controller 28 causes automatic dialing modem 30 to dial remote display 34 over telephone lines 32 as described in block 124, thereby giving notice that a delivery of substance is required. This could result in false calls to remote display 34 because of the erratic fluctuations which occur during drawing and replenishing of tank 12 if not for time-weighted averager 36.

The comparison of the collected average level with set points stored in memory 44 is set forth in Appendix 2. A total of four set points is stored in memory 44 for each tank 12. These four set points may be used in a variety of ways for each tank. For example high and low collected average set points may be defined along with high and low pressure set points. A crossing of any one of these set points triggers a call to remote location 34. Alternately three collected average set points and one pressure set point or four collected average and no pressure set points may be defined.

Additionally, controller 28 is programmed to determine the rate at which tank 12 is being depleted based upon determination of values of level over a period of time between reaching the two set points. This determination is made as set forth in Appendix 2 in which the difference between the two levels which cross the threshold set points is divided by the time between reaching the set points as determined in accordance with clock 43. The rate of usage thus determined is transmitted to remote location 34 when the occurrence of reaching the lower threshold set point is transmitted to location 34.

Controller 28 is also programmed to calculate the rate of usage during a predetermined time window immediately preceding a call from remote location 34. The duration of such a time window is stored in memory 44. For example, if operators at remote location 34 want to know the rate of usage over the preceding four hours a window duration of four hours is stored in memory 44. The operator calls system 10 and controller 28 retrieves the level of substance in tank 12 at a time four hours prior to the phone call and also determines the current level. The difference between these two levels is divided by four and an average rate of usage per hour is calculated and transmitted to remote location 34 in the form of inches of water column per hour. The duration of a time window may be reprogrammed from remote location 34 as previously described to be any number of hours from one to twenty-four.

Controller 28 as an alternate embodiment may be programmed to periodically dial remote display 34 and transmit information regarding the current level of substance in tank 12 regardless of what the level may be and to redial remote display 34 if a call is not answered. Additionally controller 28 is programmed to automatically redial remote location 34 if a call in response to a set point is unanswered. Controller 28 redials in five minutes if the call is unanswered. If the five minute redial also goes unanswered redialling continues at periods of one to ten hours until the call is answered. The period of time between redials is programmed in memory 44 and reprogrammed from remote location 34 over telephone lines 32. Operators at remote display 34 may also use telephone lines 32 and modem 30 to interrogate controller 28 to determine the level of substance in tank 12 at any time.

Controller 28 is also programmed to call an alternate remote locations, for example, remote location 34a, depending on the time of day. For example, a distributor near the site on which system 10 is located may be open from eight to five. If a set point is crossed, indicating that tank 12 must be refilled, between eight and five system 10 calls this nearby distributor. If however the set point is crossed at 6 o'clock controller 28 determines that the nearby distributor is closed by comparing the time as indicated by clock 43 with the time that the nearby distributor is open as stored in storage 44. Controller 28 is programmed to then compare the time of the set point crossing with the times that other distributors are open and to place a phone call to a distributor which is open.

Thus, if remote location 34a is called by system 10, tank 12 may be refilled by delivery 35a rather than delivery 35.

In addition, the data representative of different substances provided by each different distributor as well as the substance stored within each tank 12 are stored in storage 44. Thus when a set point is crossed for a tank 12 controller 28 can select which distributor supplies the substance and place a call to the appropriate distributor. The phone numbers, hours a distributor is open, and the substances supplied by each distributor may be changed from remote location 34 as previously described. Additionally, distributors may be added or deleted from remote location 34.

The values transmitted to remote display 34 by controller 28 may include the substance level, time, an I. D. code identifying the controller, the pressure within a tank, and, if a set point alarm has been given, the time of the alarm.

Controller 28 may also transmit the maximum and minimum level readings of tank 12 since the last time tank 12 was refilled as well as the times at which the minimum and maximum occurred. As set forth in Appendix 2 the determination of the maximum and minimum level in a tank is verified each time a new level is calculated and the time of the occurrence of a new maximum or minimum is stored in memory 44. The transmission of data to modem 30 for transmission to remote display 34 is set forth in Appendix 2. Additionally the date and time of a set point crossing may be stored in memory and transmitted to remote display 34.

Pressure transducers 18 and 20 are piezoelectric devices which have an analog output range of 2 to 12.5 volts direct current (DC). The analog outputs of transducers 18 and 20 are conditioned by signal conditioners 50 and 52. Signal conditioners 50 and 52 convert the 2.5 to 12.5 volt output ranges of pressure transducers 18 and 20 digital voltage ranges for multiplexer 46 and provides fuses for transducers 18 and 20 at approximtely 20 ma. From multiplexer 46 the signals are converted to digital signals by A/D converter 26 and applied to controller 28 which can determine whether A/D converter 26 is out of order and notify remote display 34 that A/D converter 26 is out of order. This diagnosis is made by determining that a full five volt signal can be read from A/D converter 26. Transducers 18,20 are automatically zero calibrated by controller 28. To perform this calibration controller 28 makes a determination of the output of transducers 18,20 when tank 12 is empty. This reading should be between two and three volts and is subtracted from all future readings received from transducers 18,20. As an alternate to emptying tank 12, pressure to transducers 18,20 may be temporarily turned off to give a simulated zero reading.

Additionally, there may be a temperature transducer such as thermocouple 54 to monitor the temperature of tank telemetry system 10 itself. However the temperature value is not necessary for determining the level of substance in tank 12. The signal from thermocouple 54 is conditioned by signal conditioner 48 which includes amplification and ice junction compensation for providing a reference temperature for thermocouple 54. The signal from signal conditioner 48 is applied to multiplexer 46 and multiplexed with the signals from signal conditioners 50 and 52. The temperature of system 10, as determined by thermocouple 54, is reported to remote location 34 by way of modem 30 and telephone lines 32. A/D converter 26 applied all multiplexed signals to controller 28.

Controller 28 is also programmed to determine the volume of cryogenic substance within tank 12. To make this determination two parameters are required. The first parameter is the collected average level determined by time-weighted averager 36 and stored in the memory of controller 28. The other parameter required is the pressure within vapor space 16. The analog output of transducer 18 is conditioned by signal conditioner 50, multiplexed by multiplexer 46, and applied to A/D converter 26. Thus, the signal from pressure transducer 18 is applied to microprocessor controller 28 by A/D converter 26, as shown in FIG. 2, thereby providing controller 28 with the other parameter required to determine the volume of substance space 14 for a tank 12 containing cryogenic substance.

The relationship between these two parameters, the collected average level, the pressure, and the volume of substance space 14 is a complex high order polynomial. As an alternate embodiment microprocessor 28 may be programmed to solve this polynomial. Alternately a table look up may be performed as described in block 120. An example of a cryogenic liquid contents chart which may be used for such a table look up appears in the form of a microfiche made of record in the application file as Appendix 1. The table of Appendix 1 contains the solution value of this polynomial for a plurality of pressure and substance level readings and avoids the time delay required to solve the polynomial in real time while system 10 is in operation.

In this look up table, collected average level appears on the vertical axis and pressure appears on the horizontal axis. By choosing a row depending on the average level and a column depending on the pressure a table entry may be selected. This table entry is the volume of substance space 14. Furthermore, controller 28 is programmed to compare this value of volume against a predetermined volume set point and to initiate a call to remote display 34 in response thereto as described for the level set point comparison, thereby requesting a refill of tank 12.

System 10 is provided with local display 42 and local non-volatile storage 44 as previously described. Display 42 and storage 44 allow system 10 to display and/or store all values transmitted by controller 28 to remote display 34, such as pressure, differential pressure, temperature (if a thermocouple is provided), and collected average substance level. Non-volatile storage 44 may be tape or floppy disks, but preferably is low power, semiconductor memory such as an electrically eraseable programmable read only memory to permit reprogramming from remote location 34. Volatile RAM within memory storage 44 as well as real time clock 43 may be provided with a back-up power source.

Controller 28 is programmed to perform a variety of system self diagnostics. For example controller 28 is programmed to test A/D converter 26 as previously described. Additionally, controller 28 periodically writes to each area of RAM and reads back the bits written to determine that storage 44 is working properly and reads the registers controlling the programming of all I/O ports to determine that all ports which should be programmed as inputs are programmed as inputs and that all ports which should be programmed as outputs are programmed as outputs.

Clock 43 is checked periodically by reading the registers dedicated to clock setup to determine that they contain the correct bit strings and by checking the time to make sure that it is a legal time. Transducers 18, 30 are checked by first determining that A/D converter 26 is working properly and then determining that a reading of at least two volts is received from each transducer 18,20 of each tank 12.

In system 10 the following components have been used for the operation and function as described and shown.

| Reference Numeral | Type |
|---|---|
| 18 | Sensym LX 1830 |
| 20 | Sensym LX 1801 |
| 26 | Intersil 7109 |
| 28 | Intel MCS51 Family |
| 46 | AD 7507 |
| 48 | AD 594 |
| 50,52 | LM 324 |
| 54 | Type J |
| 30 | Micro-Baud Systems Inc. 001-00-80515 |

Although the invention has been particularly shown and described with reference to a preferred embodiment thereof, it will be understood by those skilled in the art that various changes may be made therein without departing from the spirit o scope of the invention.

We claim:

1. A method for determining when to dispatch from one of a plurality of remote locations a vehicle for refilling at least one tank at a user location having a plurality of tanks in accordance with the level of substance in the tank to be refilled in which the level is subject to changes comprising the steps performed by a computer of:
   (a) continuously generating electrical signals representative of differential pressure within the tank and determining values of differential pressure from the generated differential pressure signals;
   (b) generating a signal representative of the instantaneous level of substance within the tank in response to the determined values of differential pressure;
   (c) generating a new collected average signal in response to the instaneous level signal;
   (d) comparing the new collected average signa with a predetermined set point;
   (e) selecting by the computer one of said plurality of remote locations in accordance with stored data at the user location;
   (f) transmitting a signal to the selected remote location when the new collected average signal is below the predetermined set point;
   (g) dispatching the refilling vehicle in response to a transmission; and
   (h) repeating steps (b) through (g).

2. The method of claim 1 wherein step (e) includes selecting by the computer a remote location in accordance with the time of day.

3. The method of claim 1 wherein step (e) includes selecting by the computer a remote location in accordance with the type of substance in the tank wherein substance type data is stored at the user location.

4. The method of claim 1 further comprising the step of receiving by the computer instruction signals from the remote location.

5. The method of claim 4 further comprising the step of changing the value of the set point in accordance with the received instruction signals.

6. The method of claim 4 wherein step (e) comprises selecting by the computer at the user location differing remote locations in response to the received instruction signals.

7. The method of claim 1 including the steps of providing a plurality of set points and transmitting a signal to the selected remote location when the new collected average signal falls below any of the set points of the plurality of set points.

8. The method of claim 7 comprising the further steps of
    continuously monitoring electrical signals representative of pressure and determining values of pressure from the monitored signals;
    providing both differential pressure set points and pressure set points;
    comparing the determined pressure signal with a pressure set point;
    transmitting a signal to the selected remote location in response to the pressure comparison.

9. A method for measuring from a remote location the level of substance in a tank at a user location in which the level is subject to changes, comprising the steps performed by a computer of:
    (a) continuously generating electrical signals representative of differential pressure within the tank and determining values of differential pressure from the generated differential pressure signals;
    (b) generating a signal representative of the instantaneous level of substance within the tank in response to the determined values of differential pressure;
    (c) generating a new collected average signal in response to the instaneous level signal;
    (d) determining the rate of substance depletion during a time window of predetermined duration in response to the new collected average signal, ending the time window at substantially the time of the rate determination;

(e) receiving by the computer an interrogation signal from the remote location and transmitting the rate to the remote location in response to the interrogation and, (f) repeating steps (b) through (e).

10. The method of claim 9 further comprising the steps of receiving instruction signals from the remote location and changing the duration of the time window in response to the instruction signals.

11. A method for measuring from a remote location the level of substnce in a tank of a storage tank system at a user location in which the level is subject to changes and updating a prior collected average level signal of the substance, comprising the steps performed by a computer of:

(a) continuously generating electrical signals representative of the differential pressure within the tank and determining values of differential pressure from the genenrated dififerential pressure signals;

(b) generating a signal representative of the instantaneous level of substance within the tank in response to the determined values of differential pressure;

(c) generaing a difference relationship signal between the prior collected average level signal and the instanteous level signal;

(d) generating a relative weighting factor signal for the prior collected average level signal and the instantaneous level signal which weighting factor signal varies in accordance with the difference relationship signal;

(e) generating a new collected average signal in reponse to the relative weighting factor signal;

(f) comparing by the computer the new collected average signal with a predetermined set point and generating a telecommunication signal when the new collected average signal is below the set point;

(g) determining by the computer whether selected portions of the system have failed and generating a telecommunication signal when a portion has failed;

(h) telecommunicating by the computer by placing a phone call to the remote station in response to the telecommunication signal and transmitting set point information and system failure information to the remote location; and, (i) repeating steps (b) through (h) in which the new collected average signal becomes the prior collected average signal in step (c).

12. A method for measuring from a remote location the level of substance in a tank at a user location in which the level is subject to changes and updating a prior collected average level signal of the substance, comprising the steps of:

(a) continuously generating electrical signals representative of differential pressure within the tank and determining values of differential pressure form the generated differential pressure signals;

(b) generating a signal representative of the instantaneous level of substance within the tank in response to the determined values of differential pressure;

(c) generating a difference relationship signal between the prior collected average level signal and the instantaneous level signal;

(d) generating a relative weighting factor signal for the prior collected average level signal and the instantaneous level signal which weighting factor signal varies in accordance with the difference relationship signal;

(e) generating a new collected average level signal in response to the relative weighting factor signal;

(f) generaging signals representative of maximum and minimum levels within the tank and the time of occurrence of the maximum and minimum levels;

(g) receiving interrogation signals from the remote location and transmitting to the remote location the signals representative of the maximum and minimum levels and representative of the determined times in response to the interrogation; and, (h) repeating steps (b) through (g) in which the new collected average signal becomes the prior collected average signal in step (c).

* * * * *